United States Patent
Chu et al.

(10) Patent No.: US 10,659,189 B1
(45) Date of Patent: May 19, 2020

(54) CONTROL FIELD FOR RESOURCE REQUEST WITH MULTIPLE FORMULAS FOR USE IN A WIRELESS COMMUNICATION NETWORK

(71) Applicant: Marvell International Ltd., Hamilton (BM)

(72) Inventors: Liwen Chu, San Ramon, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 16/044,213

(22) Filed: Jul. 24, 2018

Related U.S. Application Data

(60) Provisional application No. 62/536,377, filed on Jul. 24, 2017.

(51) Int. Cl.
| | |
|---|---|
| *H04W 4/00* | (2018.01) |
| *H04L 1/00* | (2006.01) |
| *H04L 29/06* | (2006.01) |
| *H04L 29/08* | (2006.01) |
| *H04W 80/02* | (2009.01) |
| *H04W 84/12* | (2009.01) |

(52) U.S. Cl.
CPC .......... *H04L 1/0006* (2013.01); *H04L 1/0033* (2013.01); *H04L 69/18* (2013.01); *H04L 69/323* (2013.01); *H04L 69/324* (2013.01); *H04W 80/02* (2013.01); *H04W 84/12* (2013.01)

(58) Field of Classification Search
CPC ..... H04L 1/0006; H04L 69/18; H04L 69/324; H04W 80/02; H04W 84/12; H04W 74/04
See application file for complete search history.

(56) References Cited

U.S. PATENT DOCUMENTS

| 9,826,532 | B1 | 11/2017 | Chu et al. |
|---|---|---|---|
| 2007/0058662 | A1 | 3/2007 | Yoshikawa |
| 2013/0058220 | A1 | 3/2013 | Yi et al. |
| 2015/0063111 | A1 | 3/2015 | Merlin et al. |
| 2015/0063191 | A1 | 3/2015 | Merlin et al. |
| 2015/0063257 | A1 | 3/2015 | Merlin et al. |

(Continued)

OTHER PUBLICATIONS

U.S. Appl. No. 15/442,398, Chu et al., "Resource Request for Uplink Multi-User Transmission," filed Feb. 24, 2017.

(Continued)

*Primary Examiner* — Abdelnabi O Musa

(57) ABSTRACT

A first communication device determines an amount of data queued at the first communication device for transmission. When a control field is to be generated according to a first format, the first communication device determines a scaling value (SV) and an unscaled value (UV) corresponding to the determined amount of data queued for transmission such that a result of SV multiplied by BV indicates the determined amount of data queued for transmission, and generates the control field to include i) a scaling factor subfield set to indicate the SV, and ii) an unscaled queue size subfield set to indicate the BV. When the control field is to be generated according to a second format, the first communication device generates the control field to include a queue size subfield set to indicate the determined amount of data queued for transmission and such that the control field does not include the scaling factor subfield.

22 Claims, 9 Drawing Sheets

(56) References Cited

U.S. PATENT DOCUMENTS

| | | | |
|---|---|---|---|
| 2015/0063258 A1 | 3/2015 | Merlin et al. | |
| 2015/0063291 A1 | 3/2015 | Merlin et al. | |
| 2015/0063318 A1 | 3/2015 | Merlin et al. | |
| 2015/0063320 A1 | 3/2015 | Merlin et al. | |
| 2015/0365940 A1 | 12/2015 | Chu et al. | |
| 2016/0095139 A1* | 3/2016 | Ding | H04W 74/04 370/329 |
| 2016/0294530 A1 | 10/2016 | Merlin et al. | |
| 2016/0374093 A1* | 12/2016 | Asterjadhi | H04W 28/0278 |
| 2017/0366312 A1 | 12/2017 | Chu et al. | |
| 2019/0246312 A1* | 8/2019 | Kim | H04W 28/02 |

OTHER PUBLICATIONS

IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).

IEEE P802.11ax™/D2.2, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 620 pages (Feb. 2018).

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

\* cited by examiner

CONTROL FIELD FOR RESOURCE REQUEST WITH MULTIPLE FORMULAS FOR USE IN A WIRELESS COMMUNICATION NETWORK

CROSS-REFERENCES TO RELATED APPLICATIONS

This application claims the benefit of U.S. Provisional Patent Application No. 62/536,377, entitled "Resource Request for Uplink Multi-User Transmission," filed on Jul. 24, 2017, which is incorporated herein by reference in its entirety.

FIELD OF THE DISCLOSURE

The present disclosure relates generally to communication networks and, more particularly, to wireless local area networks that utilize requests for radio resources.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method includes: determining, at a first communication device, an amount of data queued at the first communication device for transmission; determining, at the first communication device, whether a control field is to be generated according to a first format or a second format based on capabilities of a second communication device, wherein the first format is defined by a first communication protocol, and the second format is defined by a legacy second communication protocol; and when the first communication device determines that the control field is to be generated according to the first format: determining, at the first communication device, a scaling value (SV) and an unscaled value (UV) corresponding to the determined amount of data queued for transmission such that a result of SV multiplied by BV indicates the determined amount of data queued for transmission, and generating the control field to include i) a scaling factor subfield set to indicate the SV, and ii) an unscaled queue size subfield set to indicate the BV. The method also includes: when the first communication device determines that the control field is to be generated according to the second format, generating, at the first communication device, the control field to include a queue size subfield set to indicate the determined amount of data queued for transmission and such that the control field does not include the scaling factor subfield; generating, at the first communication device, a packet having a media access control (MAC) data unit with a MAC header, wherein the MAC header includes the control field; and transmitting, by the first communication device, the packet.

In another embodiment, an apparatus comprises: a network interface device associated with a first communication device. The network interface device includes one or more integrated circuit (IC) devices configured to: determine an amount of data queued at the first communication device for transmission, determine whether a control field is to be generated according to a first format or a second format based on capabilities of a second communication device, wherein the first format is defined by a first communication protocol, and the second format is defined by a legacy second communication protocol. The one or more IC devices are also configured to: when the network interface device determines that the control field is to be generated according to the first format: determine a scaling value (SV) and an unscaled value (UV) corresponding to the determined amount of data queued for transmission such that a result of SV multiplied by BV indicates the determined amount of data queued for transmission, and generate the control field to include i) a scaling factor subfield set to indicate the SV, and ii) an unscaled queue size subfield set to indicate the BV. The one or more IC devices are further configured to when the first communication device determines that the control field is to be generated according to the second format, generating the control field to include a queue size subfield set to indicate the determined amount of data queued for transmission and such that the control field does not include the scaling factor subfield. The one or more IC devices are also configured to: generate a packet having a media access control (MAC) data unit with a MAC header, wherein the MAC header includes the control field, and transmit the packet.

In yet another embodiment, a method includes: receiving, at a first communication device, a packet from a second communication device, the packet including a control field; determining, at the first communication device, whether the control field is in a first format or a second format based on capabilities of the second communication device, wherein the first format is defined by a first communication protocol, and the second format is defined by a legacy second communication protocol; and when the first communication device determines that the control field is in the first format: determining, at the first communication device, that the control field includes i) a scaling factor subfield set to indicate a scaling value (SV), and ii) an unscaled queue size subfield set to indicate an unscaled value (UV), and determining, at the first communication device, an estimated amount of data queued for transmission at the second communication device using i) the SV indicated by the scaling factor subfield, and ii) the UV indicated by the unscaled queue size subfield. Additionally, the method includes: when the first communication device determines that the control field is in the second format: determining, at the first communication device, that the control field i) includes i) a queue size subfield set to a value indicating the estimated amount of data queued for transmission at the second communication device, and ii) does not include the scaling factor subfield, and determining, at the first communication device, the estimated amount of data queued for transmission at the second communication device using the value in the queue size subfield.

In still another embodiment, an apparatus comprises: a network interface device associated with a first communication device. The network interface device includes one or more integrated circuit (IC) devices configured to: receive a packet from a second communication device, the packet including a control field, determine whether the control field is in a first format or a second format based on capabilities of the second communication device, wherein the first format is defined by a first communication protocol, and the second format is defined by a legacy second communication protocol. The one or more IC devices are also configured to: when the network interface device determines that the control field is in the first format: determine that the control field includes i) a scaling factor subfield set to indicate a scaling value (SV), and ii) an unscaled queue size subfield set to indicate an unscaled value (UV), and determine an estimated amount of data queued for transmission at the second communication device using i) the SV indicated by the scaling factor subfield, and ii) the UV indicated by the unscaled queue size subfield. The one or more IC devices are further configured to: when the first communication device determines that the control field is in the second format: determine that the control field i) includes i) a queue size subfield set to a value indicating the estimated amount of data queued for transmission at the second communication device, and ii) does not include the scaling factor subfield, and determine that the estimated amount of data queued for transmission at the second communication device using the value in the queue size subfield.

DETAILED DESCRIPTION

In embodiments described below, a first communication device uses a control field in a packet to indicate to a second communication device an amount of data queued for transmission at the first communication device. The first communication device and the second communication device may operate in a wireless communication network that includes communication devices that operate according to different communication protocols, such as a first communication protocol and a legacy second communication protocol, and the different communication protocols may define different formats for the control field. Embodiments of various techniques are described below that attempt to avoid inadvertently transmitting a packet with a control field of a certain format to a communication device that is not capable of recognizing the format, and/or to avoid confusion regarding the format of the control field in a particular packet.

Figure 1:
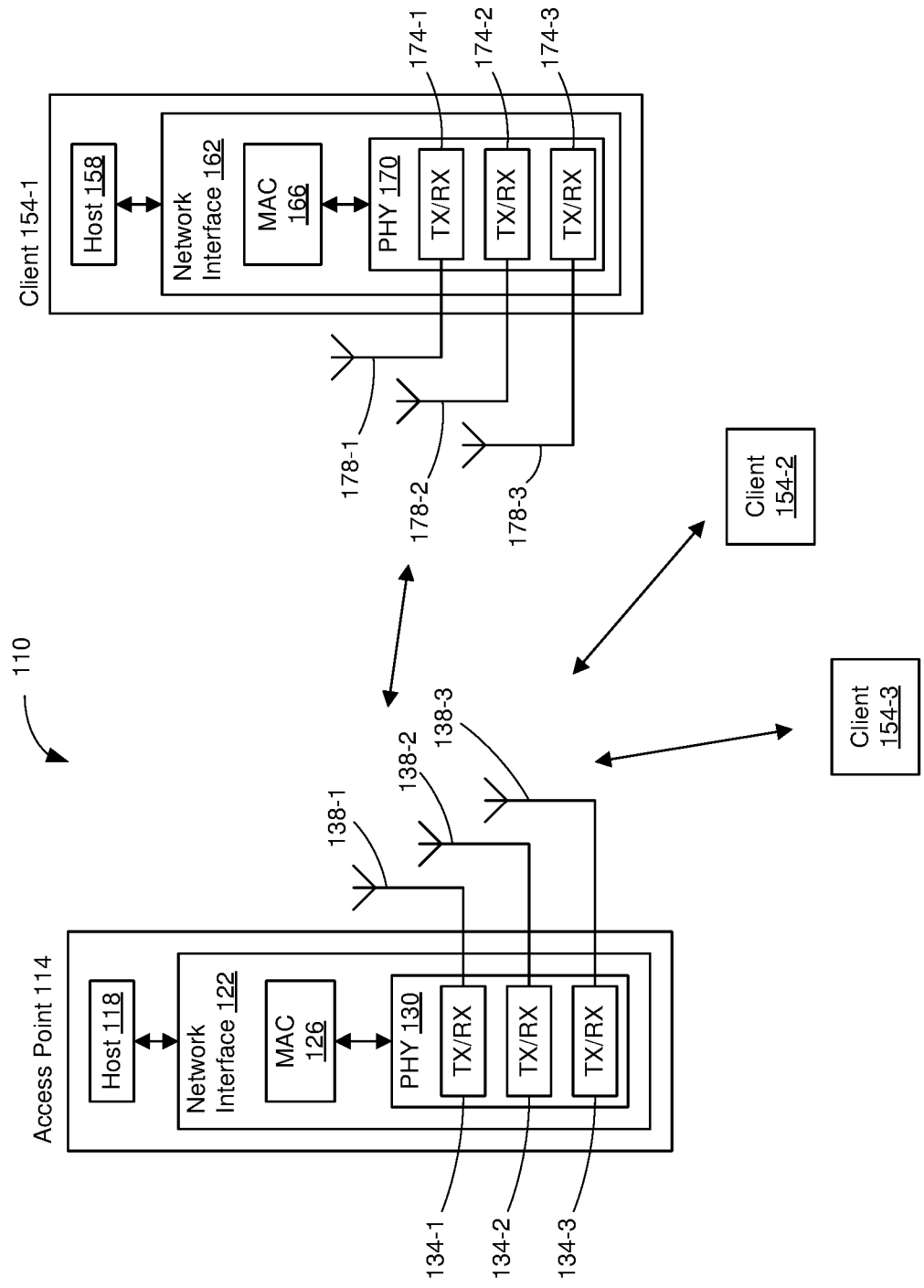
FIG. 1 is a block diagram of an example wireless local area network (WLAN), according to an embodiment.

FIG. 1 is a block diagram of an example wireless local area network (WLAN) 110, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

The MAC processor 166 includes, or is coupled to, one or more memory devices to store data that is to be transmitted to another communication device (e.g., the AP 114, another client station 154, etc.) in the WLAN 110. In an embodiment, the MAC processor 166 organizes the data stored in the one or more memory devices in one or more queues. Each queue corresponds to a different traffic class, where each traffic class generally corresponds to a respective priority level of transmission, according to an embodiment. For example, a first traffic class may correspond to relatively low priority traffic such as Hypertext Transfer Protocol (HTTP) requests, webpage data, etc., whereas a second traffic class may correspond to relatively high priority traffic such as streaming audio data. Each queue corresponds to a respective traffic identifier (TID), which generally indicates the priority of the data with respect to, for example, a maximum latency, a maximum loss rate, etc., according to which the data is to be transmitted.

The AP 114 generally manages access to the wireless medium for the WLAN 110 based on the amounts and priority levels of data that need to be transmitted by the AP 114 and the client stations 154. Each client station 154 informs the AP 114 of the respective amount(s) and priority level(s) of data that needs to be transmitted by the client station 154 by providing to the AP 114, for each of one or more queues, i) an indication of an amount of data stored in the queue, and ii) an indication of the priority level associated with the queue (e.g., a TID associated with the queue), according to an embodiment. As will be described in more detail below, the client station 154 includes (e.g., the MAC processor 166 includes) i) the indication of the amount of data stored in the queue, and ii) the indication of the priority level associated with the queue, in a field in a MAC header of a MAC data unit, and the client station 154 transmits (e.g., the network interface device 162 transmits) the MAC data unit to the AP 114 within a PHY data unit.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 2:
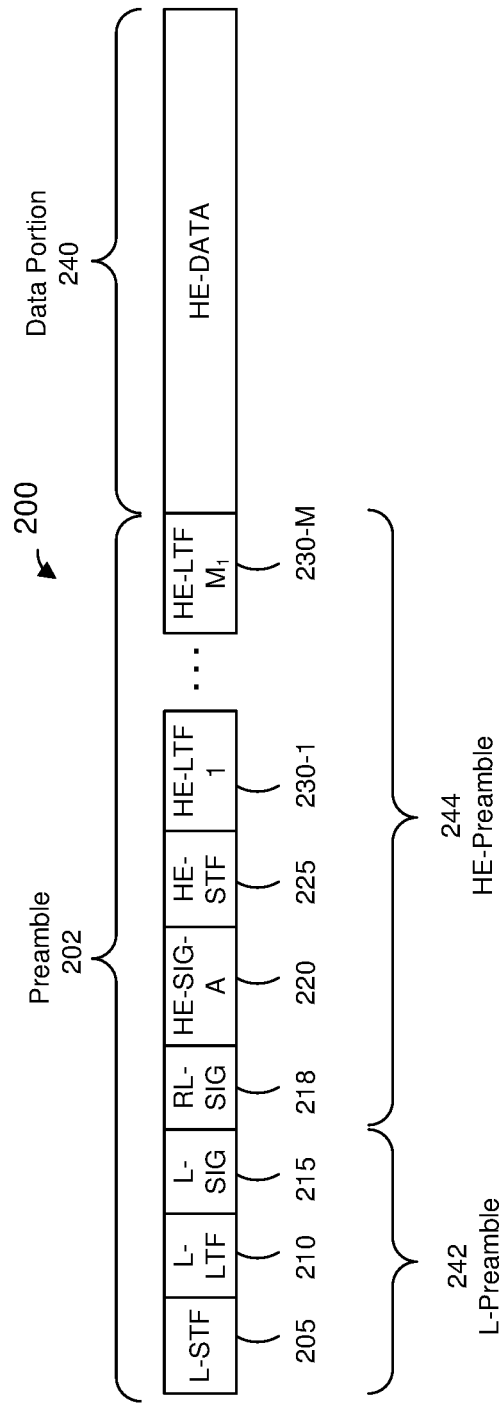
FIG. 2 is a diagram of an example physical layer (PHY) data unit that is transmitted in the WLAN of FIG. 1, according to an embodiment.

FIG. 2 is a diagram of an example PHY data unit 200 that the network interface 162 (FIG. 1) is configured to generate and transmit to the AP 114. For example, the PHY processor 170 is configured to generate and transmit the PHY data unit 200, according to an embodiment. The network interface 122 (FIG. 1) is also configured to generate and transmit PHY data units such as the PHY data unit 200 to one of the client stations 154 (e.g., the client station 154-1), according to an embodiment. For example, the PHY processor 130 is configured to generate and transmit the PHY data unit 200, according to an embodiment. The data unit 200 may occupy a 20 MHz bandwidth or another suitable bandwidth. Data units similar to the data unit 200 occupy other suitable bandwidth such as 40 MHz, 80 MHz, 160 MHz, 320 MHz, 640 MHz, for example, or other suitable bandwidths, in other embodiments.

The data unit 200 includes a PHY preamble 202 including a legacy short training field (L-STF) 205, a legacy long training field (L-LTF) 210, a legacy signal field (L-SIG) 215, a repeated L-SIG field (RL-SIG) 218, a high efficiency (HE) signal field (HE-SIG-A) 220, an HE short training field (HE-STF) 225, and M HE long training fields (HE-LTFs) 230, where M is a suitable positive integer. In an embodiment, M generally corresponds to (e.g., is greater than or equal to) a number of spatial streams via which the data unit 200 will be transmitted. A legacy preamble portion 242 of the PHY preamble 202 includes the L-STF 205, L-LTF 210 and L-SIG 215. An HE preamble portion 244 of the PHY preamble 202 includes the RL-SIG 218, the HE-SIG-A 220, the HE-STF 225 and the M HE-LTFs 230. The PHY data unit 200 also includes a data portion 240. In some scenarios, the data unit 200 may omit the data portion 240.

In some embodiments, the PHY preamble 202 omits one or more of the fields 205-230. In some embodiments, the PHY preamble 202 includes additional fields not illustrated in FIG. 2.

Each of the L-STF 205, the L-LTF 210, the L-SIG 215, the RL-SIG 218, the HE-SIG-A 220, the HE-SIG-B 222, the HE-STF 225, and the M HE-LTFs 230 comprises one or more OFDM symbols. As merely an illustrative example, the HE-SIG-A 220 comprises two OFDM symbols.

The L-STF 205 includes signals designed for packet detection, synchronization, and automatic gain control (AGC) training, according to an embodiment. The L-LTF(s) 230 includes signals designed for channel estimation, according to an embodiment. The HE-STF 225 includes signals designed for further AGC training, according to an embodiment. The HE-LTF(s) 230 includes signals designed for further channel estimation, according to an embodiment.

In the example of FIG. 2, the PHY data unit 200 includes one of each of the L-STF 205, the L-LTF 210, the L-SIG 215, the RL-SIG 218 and the HE-SIG-A 220. In some embodiments in which a PHY data unit similar to the PHY data unit 200 occupies a cumulative bandwidth other than 20 MHz, each of the L-STF 205, the L-LTF 210, the L-SIG 215, the RL-SIG 218, and the HE-SIG-A 220 is repeated over a corresponding number of 20 MHz sub-bands of the whole bandwidth of the PHY data unit, in an embodiment. For example, in an embodiment in which the PHY data unit occupies an 80 MHz bandwidth, the data unit 200 includes four of each of the L-STF 205, the L-LTF 210, the L-SIG 215, the RL-SIG 218, and the HE-SIG-A 220, where the PHY preamble in each of four different 20 MHz sub-bands has a format similar to the format of the PHY preamble 202 illustrated in FIG. 2.

In some embodiments in which a PHY data unit similar to the PHY data unit 200 occupies a cumulative bandwidth other than 20 MHz, each of the HE-STF 225 and the HE-LTFs 230 spans the whole bandwidth of the PHY data unit. For example, in an embodiment in which the PHY data unit occupies an 80 MHz bandwidth, each of the HE-STF 225 and the HE-LTFs 230 spans 80 MHz.

In an embodiment, the HE-SIG-A 220 generally carries information about the format of the PHY data unit 200, such as information needed to properly decode at least a portion of the PHY data unit 200, in an embodiment. In some embodiments, HE-SIG-A 220 additionally includes information for receivers that are not intended receivers of the PHY data unit 200, such as information needed for medium protection, spatial reuse, etc.

Figure 3:
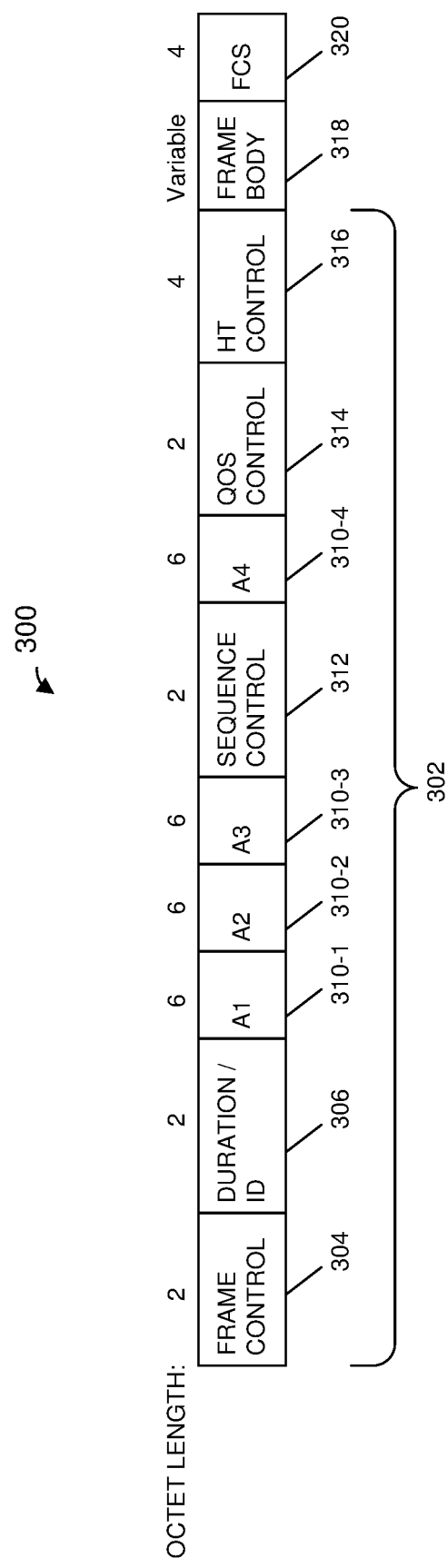
FIG. 3 is a diagram of an example medium access control layer (MAC) data unit that is included in the PHY data unit of FIG. 2, according to an embodiment.

FIG. 3 is a diagram of an MPDU 300 that may be included in the data portion 240 of the PHY data unit 200 of FIG. 2, according to an embodiment. The MPDU 300 includes a MAC header 302, a frame body 318, and a frame check sequence (FCS) field 320. The MPDU 300 generally conforms to the IEEE Standard for Information Technology, Part 11: Wireless LAN Medium Access Control (MAC) and Physical Layer (PHY) Specifications, 2012 ("the IEEE 802.11-2012 standard"), the disclosure of which is incorporated herein by reference in its entirety. An example number of octets occupied by each corresponding field is indicated above the field in FIG. 3. Accordingly, the MAC header 302 includes a frame control field 304 (2 octets), a duration/ID field 306 (2 octets), a first address (A1) field 310-1 (6 octets), a second address (A2) field 310-2 (6 octets), a third address (A3) field (6 octets) 310-3, a sequence control field 312 (2 octets), a fourth address (A4) field 310-4 (6 octets), a QoS control field 314 (2 octets), and an HT control field 316 (4 octets). The MPDU 300 also includes the frame body 318 and the four-octet FCS field 320. In some embodiments, the frame body 318 is omitted (e.g., a null data frame). Each of the address fields 310 is a 48 bit (6 octet) field that includes a globally unique MAC address of a device associated with the data unit 300, such as a transmitting device of the data unit 300, a receiving device of the data unit 300, etc. In general, the MAC header 302 occupies 36 octets of the MPDU 300. In other embodiments, each of one or more fields occupies another suitable number of octets or bits. In other embodiments, one or more of the fields illustrated in FIG. 3 is omitted, and/or one or more additional fields are included.

Figure 4:
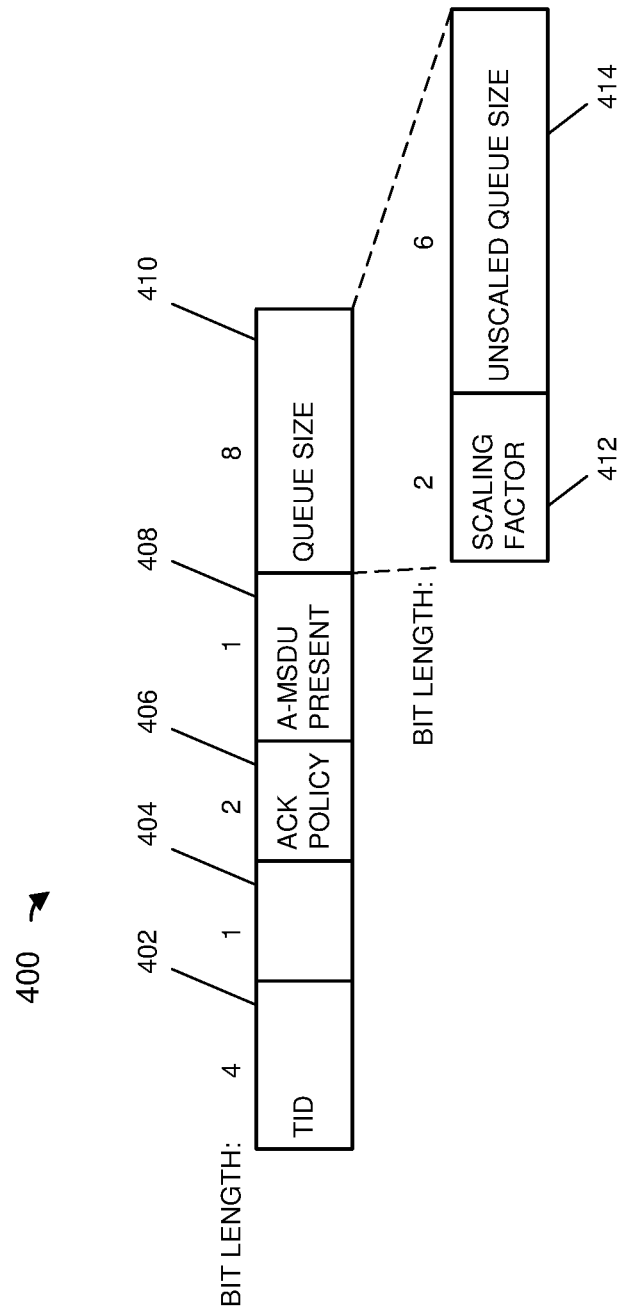
FIG. 4 is a diagram of an example control field that is included in the MAC data unit of FIG. 3, according to an embodiment.

FIG. 4 is a diagram of an example QoS control field 400 that may be included in the example MPDU 300 of FIG. 3 as the QoS control field 314, according to an embodiment. The QoS control field 400 includes a TID subfield 402 (e.g., bits 0-3), a subfield 404 (e.g., bit 4), an acknowledgment policy subfield 406 (e.g., bits 5-6), an A-MSDU present subfield 408 (e.g., bit 7), and a queue size subfield 410 (e.g., bits 8-15). The queue size subfield 410 includes a scaling factor subfield 412 and an unscaled queue size subfield 414. The numbers above the subfields in FIG. 4 indicate an example number of bits occupied by the corresponding subfield. In other embodiments, one or more of the subfields in FIG. 4 includes another suitable number of bits. For example, in an embodiment, the scaling factor subfield 412 includes 3 or 4 bits, and/or the unscaled queue size subfield 414 includes 4 or 5 bits.

In various embodiments, the queue size subfield 410 indicates buffer information corresponding to queued MPDUs that are queued for transmission, in an embodiment. For example, the buffer information indicates a number of bytes (sometimes referred to as "octets") corresponding to the queued MPDUs for transmission. The buffer information in the queue size subfield 410 is provided by the client station 154 to the AP 114 to facilitate the AP 114 determining one or more parameters for uplink transmission allocation (e.g., uplink transmission scheduling, uplink MU (e.g., MU-MIMO and/or OFDMA) resource allocation, uplink PPDU length, uplink frequency position, uplink channel bandwidth, a modulation and coding scheme (MCS) to be used for an uplink transmission, an uplink transmission power, or other suitable parameters. In some scenarios, the client station 154 utilizes the QoS control field 400 to provide buffer information; however, the QoS control field as described in the IEEE 802.11-2012 standard cannot readily describe a number of bytes less than 256 bytes or higher than 64,768 bytes in increments of 256 octets.

The scaling factor subfield 412 indicates a scaling value (SV), and the unscaled queue size subfield 414 indicates an unscaled value (UV) associated with a buffer size. The buffer size (in bytes) indicated by the queue size subfield 410 is determined based on multiplying the SV with the UV. In an embodiment, SV indicates a unit size selected from a set of unit sizes consisting of at least three different values (e.g., 3 different values, 4 different values, 5 different values, 6 different values, 7 different values, . . . ) Table 1 is an example of SVs corresponding to different values of the queue size subfield 410, according to an embodiment.

TABLE 1

| queue size subfield 410 | SV |
|---|---|
| 00 | 16 octets |
| 01 | 64 octets |
| 10 | 512 octets |
| 11 | 4096 octets |

Table 2 is another example of SVs corresponding to different values of the queue size subfield 410, according to another embodiment.

TABLE 2

| queue size subfield 410 | SV |
|---|---|
| 00 | 16 octets |
| 01 | 64 octets |
| 10 | 512 octets |
| 11 | 8192 octets |

In other embodiments, other suitable SVs correspond to the different values of the queue size subfield 410.

Figure 5:
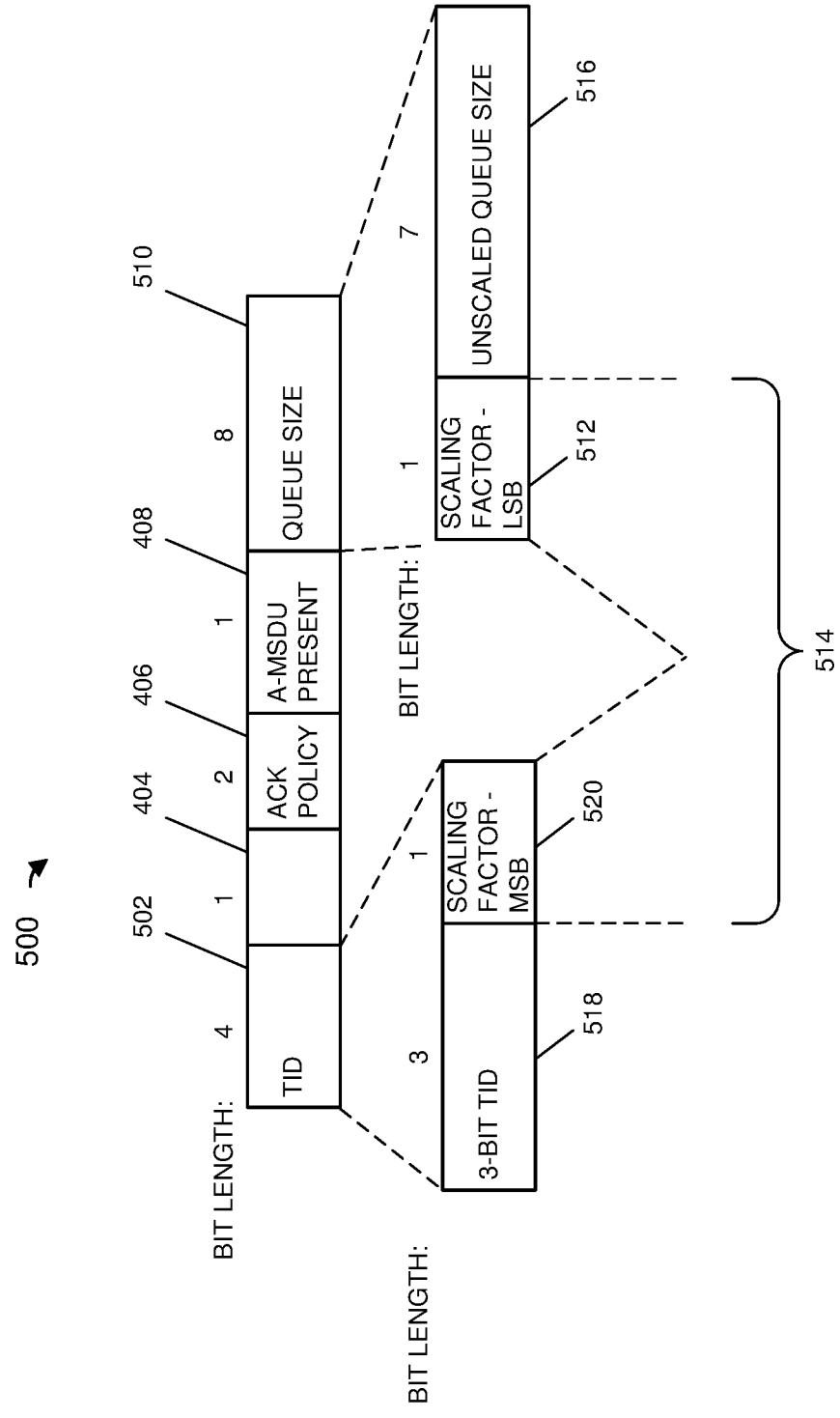
FIG. 5 is a diagram of another example control field that is included in the MAC data unit of FIG. 3, according to another embodiment.

FIG. 5 is a diagram of another example QoS control field 500 that may be included in the example MPDU 300 of FIG. 3 as the QoS control field 314, according to another embodiment. The QoS control field 500 is similar to the QoS control field 400 of FIG. 4, and like-numbered elements are not discussed in detail for purposes of brevity.

The QoS control field 500 includes a TID subfield 502 (e.g., bits 0-3) and a queue size subfield 510 (e.g., bits 8-15). The queue size subfield 510 includes a first portion 512 of a scaling factor subfield 514. The queue size subfield 510 also includes an unscaled queue size subfield 516. The TID subfield 502 includes a TID value subfield 518 and a second portion 520 of the scaling factor subfield 514. The numbers above the subfields in FIG. 5 indicate an example number of bits occupied by the corresponding subfield. In other embodiments, one or more of the subfields in FIG. 5 includes another suitable number of bits. For example, in an embodiment, the scaling factor subfield 514 includes 3 or 4 bits, and/or the unscaled queue size subfield 516 includes 5 or 6 bits, and/or the TID value subfield 518 includes 2 bits.

In various embodiments, the queue size subfield 510 in combination with the second portion 520 of the scaling factor subfield 514 indicates buffer information corresponding to queued MPDUs that are queued for transmission, in an embodiment. For example, the buffer information indicates a number of bytes (sometimes referred to as "octets") corresponding to the queued MPDUs for transmission. For example, the scaling factor subfield 514 indicates the SV, and the unscaled queue size subfield 516 indicates the UV associated with the buffer size, as discussed with reference to FIG. 4.

Although in FIG. 5 the first portion 512 of the scaling factor subfield 514 is indicated at being a least significant bit (LSB) of the scaling factor subfield 514, the first portion 512 of the scaling factor subfield 514 is a most significant bit (MSB) of the scaling factor subfield 514, and the second portion 520 of the scaling factor subfield 514 is the MSB of the scaling factor subfield 514, according to another embodiment.

Figure 6:
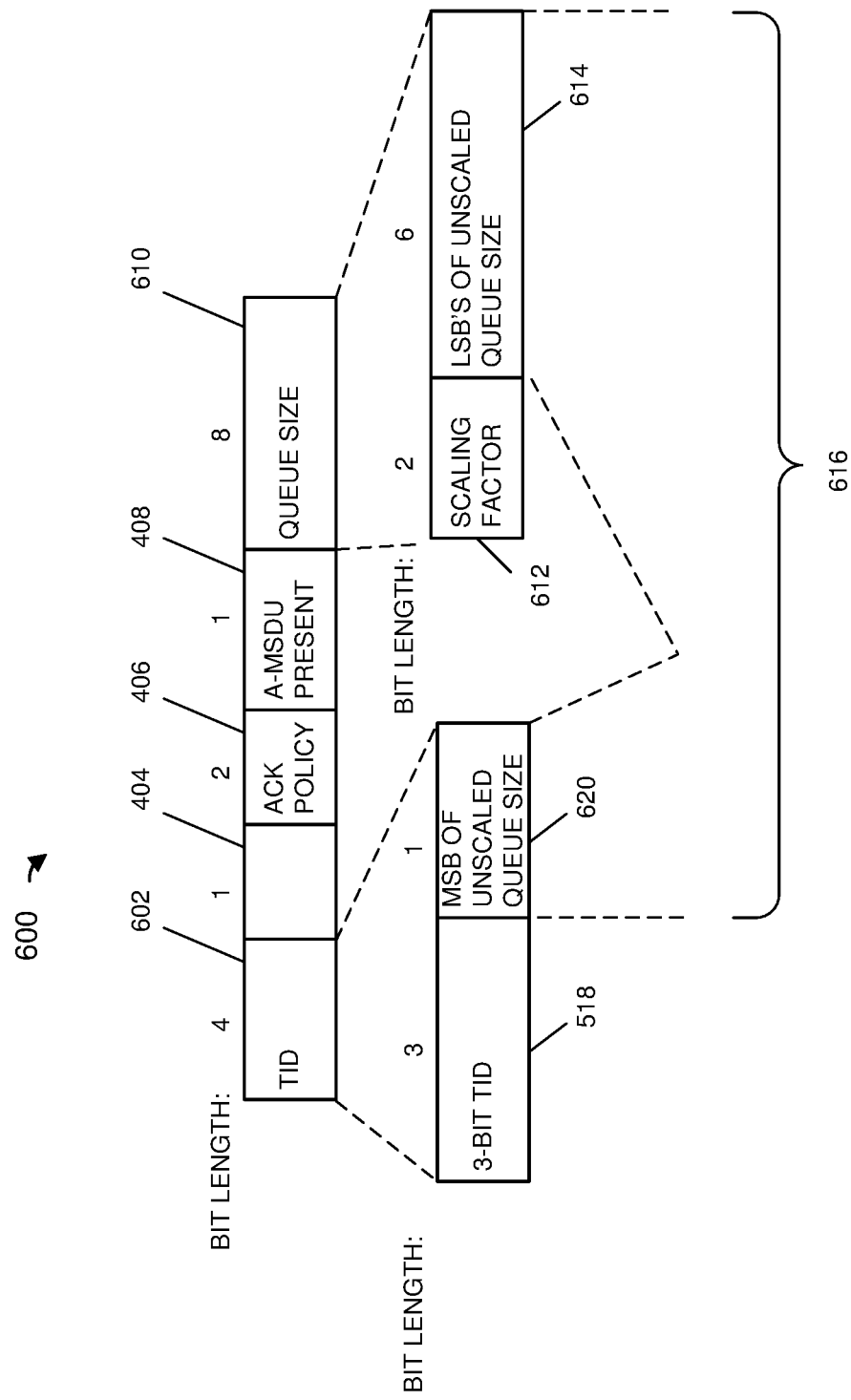
FIG. 6 is a diagram of another example control field that is included in the MAC data unit of FIG. 3, according to another embodiment.

FIG. 6 is a diagram of yet another example QoS control field 600 that may be included in the example MPDU 300 of FIG. 3 as the QoS control field 314, according to another embodiment. The QoS control field 600 is similar to the QoS control field 400 of FIG. 4 and the QoS control field 500 of FIG. 5, and like-numbered elements are not discussed in detail for purposes of brevity.

The QoS control field 600 includes a TID subfield 602 (e.g., bits 0-3) and a queue size subfield 610 (e.g., bits 8-15). The queue size subfield 610 includes a scaling factor subfield 612. The queue size subfield 610 also includes a first portion 614 of an unscaled queue size subfield 516. The TID subfield 602 includes a second portion 620 of the unscaled queue size subfield 516. The numbers above the subfields in FIG. 6 indicate an example number of bits occupied by the corresponding subfield. In other embodiments, one or more of the subfields in FIG. 6 includes another suitable number of bits. For example, in an embodiment, the scaling factor subfield 514 includes 3 or 4 bits, and/or the first portion 614 of the unscaled queue size subfield 616 includes 4 or 5 bits, and/or the TID value subfield 518 includes 2 bits.

In various embodiments, the queue size subfield 610 in combination with the second portion 620 of the unscaled queue size subfield 516 indicates buffer information corresponding to queued MPDUs that are queued for transmission, in an embodiment. For example, the buffer information indicates a number of bytes (sometimes referred to as "octets") corresponding to the queued MPDUs for transmission. For example, the scaling factor subfield 612 indicates the SV, and the unscaled queue size subfield 616 indicates the UV associated with the buffer size, as discussed with reference to FIG. 4.

Although in FIG. 6 the second portion 620 of the unscaled queue size subfield 616 is indicated at being an MSB of the unscaled queue size subfield 616, the second portion 620 of the unscaled queue size subfield 616 is another suitable portion of the unscaled queue size subfield 616, such as an LSB of the unscaled queue size subfield 616, according to another embodiment.

Referring now to FIGS. 3-6, a network interface device may include (e.g., the MAC processor 166 may include) the QOS control frame 400/500/600 in the MPDU 300, which also includes data for another communication device (e.g., the AP 114, another client station 154, etc.) in the frame body 318, according to some embodiments. An MPDU that includes the QOS control frame 400/500/600 and also includes data for the AP 114 (or another client station 154) is sometimes referred to as a QOS Data frame. A network interface device may include (e.g., the MAC processor 166 may include) the QOS control frame 400/500/600 in the MPDU 300, which omits the frame body 318, according to some embodiments. An MPDU that includes the QOS control frame 400/500/600 and omits the frame body 318 is sometimes referred to as a QOS Null frame.

Referring now to FIG. 2, a network interface device may include (e.g., the PHY processor 170 may include) a QOS Data frame or a QOS Null frame in the PPDU 200, according to an embodiment. According to various embodiments, the PPDU 200 conforms to the IEEE 802.11ax Standard, now under development, or another suitable wireless communications protocol. Referring now to FIG. 1, in some embodiments, the wireless communication network 110 includes some devices that operate according to a first communication protocol (e.g., the IEEE 802.11ax Standard), and one or more devices that operate according to a legacy second communication protocol (e.g., the IEEE 802.11ac Standard, the IEEE 802.11n Standard, etc.) and which are not configured to operate according to the first communication protocol (sometimes referred to herein as "legacy devices").

The legacy second communication protocol defines a legacy QOS control field similar to the QOS control field 400 of FIG. 4, where the legacy QOS control field does not include a scaling factor subfield such as the scaling factor subfield 412, or which includes only a single-bit scaling factor subfield, according to an embodiment. Thus, in some embodiments, the wireless communication network 110 includes legacy devices that are capable of generating and processing MAC data units having QOS control fields with a different format than the QOS control field 400/500/600, and which will not recognize the format of the QOS control field 400/500/600.

Figure 7:
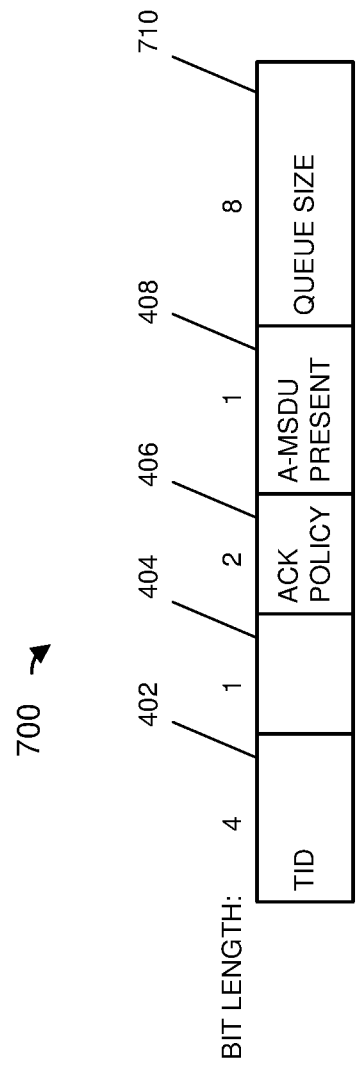
FIG. 7 is a diagram of a prior art control field that can be included in MAC data units.

FIG. 7 is a diagram of a prior art QOS control field 700. The QOS control field 700 is an example of a legacy QOS control field does not include a scaling factor subfield such as the scaling factor subfield 412. The QOS control field 700 is similar to the QOS control field 400 of FIG. 4, and like-numbered elements are not discussed in detail for purposes of brevity.

The prior art QOS control field 700 includes a queue size subfield 710 comprising eight bits (e.g., bits 8-15). The queue size subfield 710 does not include a scaling factor subfield. The queue size subfield 710 includes an eight-bit number that is an approximate total amount of data (queued for transmission) rounded up to the nearest multiple of 256 octets and expressed in units of 256 octets.

To avoid inadvertently transmitting a packet having the QOS control field 400/500/600 to a legacy device and/or to avoid confusion regarding the format of a QOS control field in a particular packet, the first communication protocol sets forth one or more conditions regarding the use of the QOS control field 400/500/600, according to some embodiments.

For example, if a QOS control field is to be included in a PPDU that conforms to the first communication protocol, the QOS control field should not be a legacy QOS control field, but should have a format such as discussed with respect to any of FIGS. 4-6, according to an embodiment. As another example, if a QOS control field is to be included in a PPDU that is to be exchanged between two communication devices that are both configured to operate according to the first communication protocol (and whether or not the PPDU conforms to the first communication protocol), the QOS control field should not be a legacy QOS control field, but should have a format such as discussed with respect to any of FIGS. 4-6, according to another embodiment.

In some embodiments, communication devices in the wireless network 110 exchange capability information regarding capabilities of the communication devices, and the capability information includes information indicating whether a communication device is configured to recognize the format of the QOS control field discussed with reference to FIGS. 4-6. In an embodiment, a QOS control field in a PPDU being transmitted to a communication device may have a format such as discussed with reference to FIGS. 4-6 if the communication device indicated (e.g., by transmitting capability information) that the communication device is configured to recognize the format of the QOS control field discussed with reference to FIGS. 4-6. In this embodiment, a QOS control field in a PPDU being transmitted to a communication device may not have a format such as discussed with reference to FIGS. 4-6 if the communication device has not indicated (e.g., by transmitting capability information) that the communication device is configured to recognize the format of the QOS control field discussed with reference to FIGS. 4-6.

In some embodiments, a QOS control field may have different formats including i) a first format with a multi-bit scaling factor subfield such as discussed with reference to FIGS. 4-6, and ii) one or more second formats that do not include a multi-bit scaling factor subfield such as discussed with reference to FIGS. 4-6. In some such embodiments, the first format requires that the subfield 404 is set to a particular value, such as one. In other words, if the QOS control field includes a multi-bit scaling factor subfield such as discussed with reference to FIGS. 4-6, the subfield 404 is required to be set to the particular value, e.g., set to one; and if the subfield 404 is not set to the particular value (e.g., set to one), the QOS control field does not include a multi-bit scaling factor subfield such as discussed with reference to FIGS. 4-6, according to an embodiment.

Figure 8:
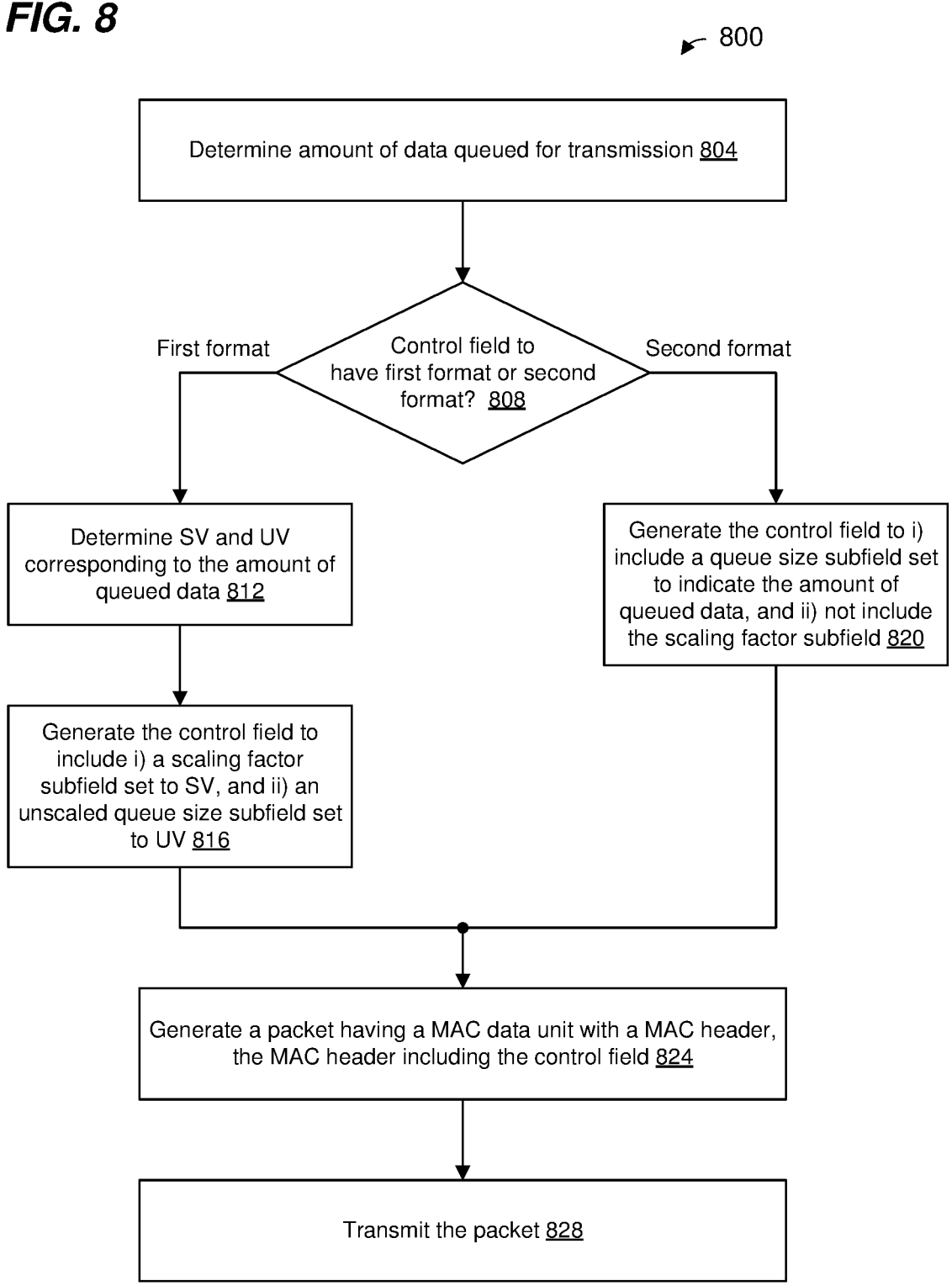
FIG. 8 is a flow diagram of an example method for indicating an amount of data that a communication device has queued for transmission, according to an embodiment.

FIG. 8 is a flow diagram of an example method 800 for indicating an amount of data that a first communication device has queued for transmission, according to an embodiment. In an embodiment, the method 800 is implemented by the network interface device 162 of FIG. 1. FIG. 8 is described with reference to FIG. 1 merely for explanatory purposes. In other embodiments, the method 800 is implemented by another communication device.

At block 804, the network interface device 162 determines (e.g., the MAC processor 166 determines) an amount of data queued for transmission. In an embodiment, the data queued for transmission is associated with one or more TIDs.

At block 808, the network interface device 162 determines (e.g., the MAC processor 166 determines) whether a control field is to be generated according to a first format or a second format based on capabilities of a second communication device. The first format is defined by the first communication protocol, and the second format is defined by the legacy second communication protocol, according to an embodiment. In some embodiments, the first format corresponds to one of the formats discussed with reference to FIGS. 4-6, and the second format corresponds to the format discussed with reference to FIG. 7.

According to an embodiment, determining whether the control field is to be generated according to the first format or the second format includes: determining whether the second communication device is configured to operate according to the first communication protocol; in response to determining that the second communication device is configured to operate according to the first communication protocol, determining that the control field is to be generated according to the first format; and in response to determining that the second communication device is not configured to operate according to the first communication protocol, determining that the control field is to be generated according to the second format.

According to an embodiment, determining whether the control field is to be generated according to the first format or the second format includes: determining whether the packet is to conform to a PHY data unit format defined by the first communication protocol; in response to determining that the packet is to conform to the PHY data unit format defined by the first communication protocol, determining that the control field is to be generated according to the first format; and in response to determining that the packet is not to conform to the PHY data unit format defined by the first communication protocol, determining that the control field is to be generated according to the second format.

According to an embodiment, determining whether the control field is to be generated according to the first format or the second format includes: determining whether the second communication device is configured to recognize the first format; in response to determining that the second communication device is configured to recognize the first format, determining that the control field is to be generated according to the first format; and in response to determining that the second communication device is not configured to recognize the first format, determining that the control field is to be generated according to the second format.

If the network interface device 162 determines (e.g., the MAC processor 166 determines), at block 808, that the control field is to be generated according to the first format, the flow proceeds to block 812. At block 812, the network interface device 162 determines (e.g., the MAC processor 166 determines) an SV and a UV corresponding to the amount of data determined at block 804 such that SV*UV indicates the amount of data determined at block 804. For example, SV*UV is an estimate of the amount of data determined at block 804. In an embodiment, SV*UV corresponds to the amount of data determined at block 804 rounded up to a next unit of data corresponding to the value of SV.

In an embodiment, block 812 includes selecting SV from a set of at least three predetermined values. In an embodiment, block 812 includes selecting SV from a set of at least four predetermined values. In an embodiment, block 812 includes selecting SV from a set of four predetermined values included in Table 1. In an embodiment, block 812 includes selecting SV from a set of four predetermined values included in Table 2.

At block 816, the network interface device 162 generates (e.g., the MAC processor 166 generates) the control field to include i) a scaling factor subfield set to indicate the SV, and ii) an unscaled queue size subfield set to indicate the UV. In an embodiment, the scaling factor subfield comprises multiple bits.

In an embodiment block 816 includes generating the control field to also include a TID subfield set to indicate a TID value corresponding to the data queued for transmission.

On the other hand, if the first communication determines, at block 808, that the control field is to be generated according to the second format, the flow proceeds to block 820. At block 820, the network interface device 162 generates (e.g., the MAC processor 166 generates) the control field to include a queue size subfield set to indicate the determined amount of data queued for transmission. In an embodiment, the network interface device 162 generates (e.g., the MAC processor 166 generates) the control field at block 820 such that the control field does not include any scaling factor subfield.

In an embodiment block 820 includes generating the control field to also include the TID subfield set to indicate the TID value corresponding to the data queued for transmission.

At block 824, the network interface device 162 generates a packet having a MAC data unit with a MAC header. The MAC header includes the control field. Block 824 includes i) the network interface device 162 generating (e.g., the MAC processor 166 generating) the MAC data unit, and ii) the network interface device 162 generating (e.g., the PHY processor 170 generating) a PHY data unit that includes the MAC data unit.

At block 828, the network interface device 162 transmits the packet generated at block 824.

Figure 9:
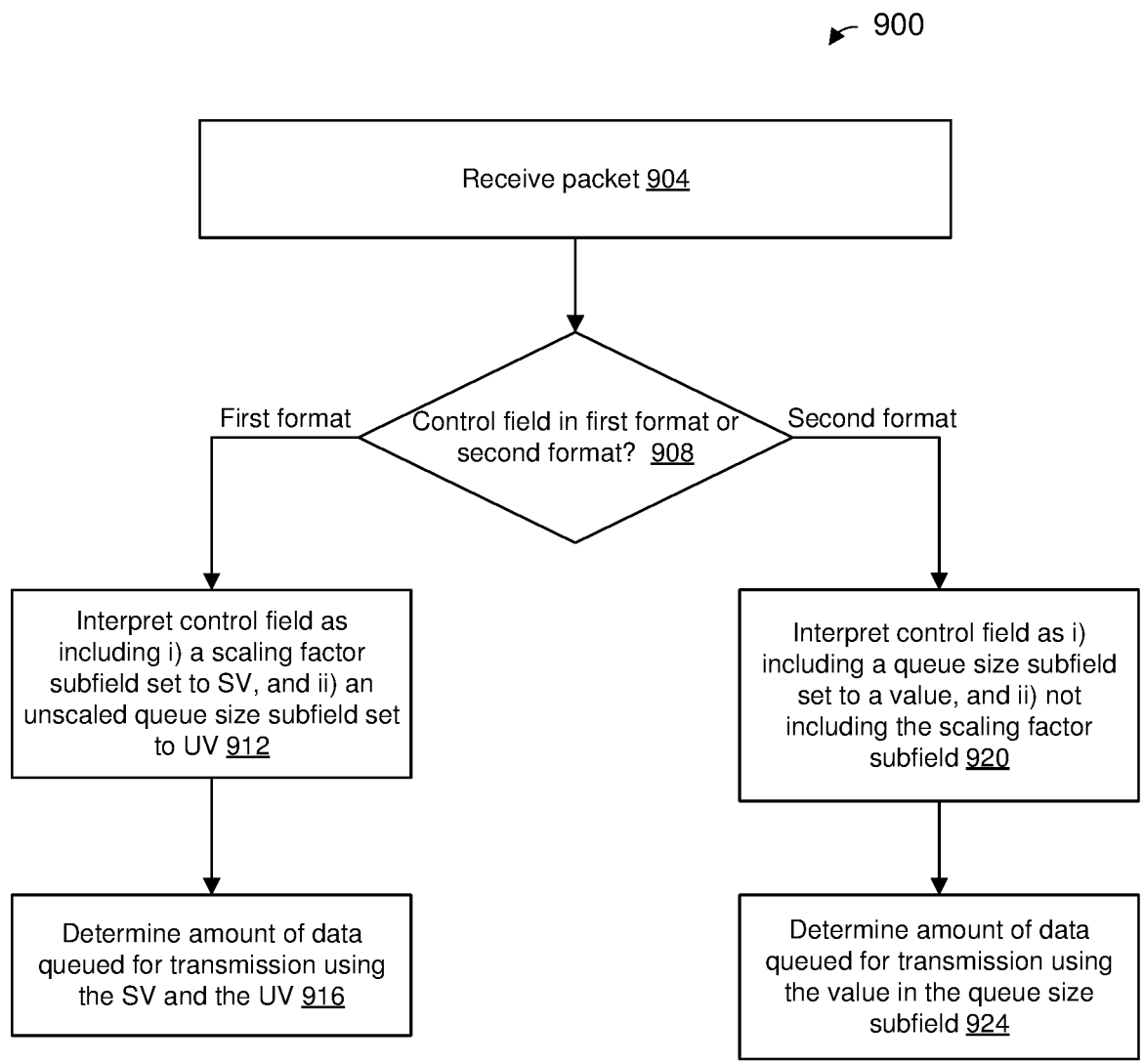
FIG. 9 is a flow diagram of an example method for determining an amount of data that a communication device has queued for transmission, according to an embodiment.

FIG. 9 is a flow diagram of an example method 900 for determining, at a first communication device, an amount of data that a second communication device has queued for transmission, according to an embodiment. In an embodiment, the method 900 is implemented by the network interface device 122 of FIG. 1. FIG. 9 is described with reference to FIG. 1 merely for explanatory purposes. In other embodiments, the method 900 is implemented by another communication device.

At block 904, the network interface device 122 receives (e.g., the PHY processor 130 receives) a packet from the second communication device. The packet include a control field. In an embodiment, the packet includes a MAC data unit with a MAC header, and the control field is included in the MAC header.

At block 908, the network interface device 122 determines (e.g., the MAC processor 126 determines) whether the control field is in a first format or a second format. In an embodiment, the network interface device 122 determines (e.g., the MAC processor 126 determines) whether the control field is in a first format or a second format based on capabilities of the second communication device. The first format is defined by the first communication protocol, and the second format is defined by the legacy second communication protocol, according to an embodiment. In some embodiments, the first format corresponds to one of the formats discussed with reference to FIGS. 4-6, and the second format corresponds to the format discussed with reference to FIG. 7.

According to an embodiment, determining whether the control field is in the first format or the second format includes: determining whether the second communication device is configured to operate according to the first communication protocol; in response to determining that the second communication device is configured to operate according to the first communication protocol, determining that the control field in the first format; and in response to determining that the second communication device is not configured to operate according to the first communication protocol, determining that the control field is in the second format.

According to an embodiment, determining whether the control field is in the first format or the second format includes: determining whether the packet conforms to a PHY data unit format defined by the first communication protocol; in response to determining that the packet conforms to the PHY data unit format defined by the first communication protocol, determining that the control field is in the first format; and in response to determining that the packet does not conform to the PHY data unit format defined by the first communication protocol, determining that the control field is in the second format.

According to an embodiment, determining whether the control field is in the first format or the second format includes: determining whether the second communication device is configured to recognize the first format; in response to determining that the second communication device is configured to recognize the first format, determining that the control field is in the first format; and in response to determining that the second communication device is not configured to recognize the first format, determining that the control field is in the second format.

If the network interface device 122 determines (e.g., the MAC processor 126 determines), at block 908, that the control field is in the first format, the flow proceeds to block 912. At block 912, the network interface device 162 interprets (e.g., the MAC processor 166 interprets) the control field as including i) a scaling factor subfield set to indicate an SV, and ii) an unscaled queue size subfield set to indicate a UV.

At block 916, the network interface device 122 determines (e.g., the MAC processor 126 determines) an estimated amount of data queued for transmission at the second communication device using i) the SV indicated by scaling factor subfield, and ii) the UV indicated by the unscaled queue size subfield. For example, the network interface device 122 determines (e.g., the MAC processor 126 determines) an estimated amount of data queued for transmission according to SV*UV, in an embodiment.

On the other hand, if the network interface device 122 determines (e.g., the MAC processor 126 determines), at block 908, that the control field is in the second format, the flow proceeds to block 920. At block 920, the network interface device 162 interprets (e.g., the MAC processor 166 interprets) the control field as i) including a queue size subfield, and ii) not including a scaling factor subfield.

At block 924, the network interface device 122 determines (e.g., the MAC processor 126 determines) an estimated amount of data queued for transmission at the second communication device using a value included in the queue size subfield.

In an embodiment, the control field also includes a TID subfield set to indicate a TID value corresponding to the data queued for transmission at the second communication device. In an embodiment, the network interface device 122 determines (e.g., the MAC processor 126 determines) the estimated amount of data queued for transmission at the second communication device is determined (e.g., at block 916 or block 924) as corresponding to one or more TIDs as indicated by the TID value in the TID subfield.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method in a wireless communication network, the method comprising:
    determining, at a first communication device, an amount of data queued at the first communication device for transmission;
    determining, at the first communication device, whether a control field is to be generated according to a first format or a second format based on capabilities of a second communication device, wherein the first format is defined by a first communication protocol, and the second format is defined by a legacy second communication protocol;
    when the first communication device determines that the control field is to be generated according to the first format:

determining, at the first communication device, a scaling value (SV) and an unscaled value (UV) corresponding to the determined amount of data queued for transmission such that a result of SV multiplied by UV indicates the determined amount of data queued for transmission, and generating, at the first communication device, the control field to include i) a scaling factor subfield set to indicate the SV, and ii) an unscaled queue size subfield set to indicate the UV;

when the first communication device determines that the control field is to be generated according to the second format, generating, at the first communication device, the control field to include a queue size subfield set to indicate the determined amount of data queued for transmission and such that the control field does not include the scaling factor subfield;

generating, at the first communication device, a packet having a media access control (MAC) data unit with a MAC header, wherein the MAC header includes the control field; and transmitting, by the first communication device, the packet.

2. The method of claim 1, wherein determining whether the control field is to be generated according to the first format or the second format includes:

determining, at the first communication device, whether the second communication device is configured to operate according to the first communication protocol;

in response to determining that the second communication device is configured to operate according to the first communication protocol, determining that the control field is to be generated according to the first format; and in response to determining that the second communication device is not configured to operate according to the first communication protocol, determining that the control field is to be generated according to the second format.

3. The method of claim 1, wherein determining whether the control field is to be generated according to the first format or the second format includes:

determining, at the first communication device, whether the packet is to conform to a physical layer (PHY) data unit format defined by the first communication protocol;

in response to determining that the packet is to conform to the PHY data unit format defined by the first communication protocol, determining that the control field is to be generated according to the first format; and in response to determining that the packet is not to conform to the PHY data unit format defined by the first communication protocol, determining that the control field is to be generated according to the second format.

4. The method of claim 1, wherein determining whether the control field is to be generated according to the first format or the second format includes:

determining, at the first communication device, whether the second communication device is configured to recognize the first format;

in response to determining that the second communication device is configured to recognize the first format, determining that the control field is to be generated according to the first format; and in response to determining that the second communication device is not configured to recognize the first format, determining that the control field is to be generated according to the second format.

5. The method of claim 1, wherein:

a particular traffic identifier (TID) indicates a priority level associated with the data queued for transmission;

when the first communication device determines that the control field is to be generated according to the first format, generating the control field includes generating the control field to include a TID subfield set to indicate the TID associated with the data queued for transmission; and when the first communication device determines that the control field is to be generated according to the second format, generating the control field includes generating the control field to include a TID subfield set to indicate the TID associated with the data queued for transmission.

6. The method of claim 1, wherein the scaling factor subfield comprises a plurality of bits.

7. An apparatus in a wireless communication network, the apparatus comprising:

a network interface device associated with a first communication device, the network interface device having one or more integrated circuit (IC) devices configured to:

determine an amount of data queued at the first communication device for transmission, determine whether a control field is to be generated according to a first format or a second format based on capabilities of a second communication device, wherein the first format is defined by a first communication protocol, and the second format is defined by a legacy second communication protocol, and when the network interface device determines that the control field is to be generated according to the first format:

determine a scaling value (SV) and an unscaled value (UV) corresponding to the determined amount of data queued for transmission such that a result of SV multiplied by UV indicates the determined amount of data queued for transmission, and generate the control field to include i) a scaling factor subfield set to indicate the SV, and ii) an unscaled queue size subfield set to indicate the UV;

wherein the one or more IC devices are further configured to when the first communication device determines that the control field is to be generated according to the second format, generating the control field to include a queue size subfield set to indicate the determined amount of data queued for transmission and such that the control field does not include the scaling factor subfield; and wherein the one or more IC devices are further configured to:

generate a packet having a media access control (MAC) data unit with a MAC header, wherein the MAC header includes the control field, and transmit the packet.

8. The apparatus of claim 7, wherein the one or more IC devices are further configured to:

determine whether the second communication device is configured to operate according to the first communication protocol;

in response to determining that the second communication device is configured to operate according to the first communication protocol, determine that the control field is to be generated according to the first format; and in response to determining that the second communication device is not configured to operate according to the first communication protocol, determine that the control field is to be generated according to the second format.

9. The apparatus of claim 7, wherein the one or more IC devices are further configured to:
   determine whether the packet is to conform to a physical layer (PHY) data unit format defined by the first communication protocol;
   in response to determining that the packet is to conform to the PHY data unit format defined by the first communication protocol, determine that the control field is to be generated according to the first format; and
   in response to determining that the packet is not to conform to the PHY data unit format defined by the first communication protocol, determine that the control field is to be generated according to the second format.

10. The apparatus of claim 7, wherein the one or more IC devices are further configured to:
    determine whether the second communication device is configured to recognize the first format;
    in response to determining that the second communication device is configured to recognize the first format, determine that the control field is to be generated according to the first format; and
    in response to determining that the second communication device is not configured to recognize the first format, determine that the control field is to be generated according to the second format.

11. The apparatus of claim 7, wherein:
    a particular traffic identifier (TID) indicates a priority level associated with the data queued for transmission;
    the one or more IC devices are configured to:
        when the network interface device determines that the control field is to be generated according to the first format, generate the control field to include a TID subfield set to indicate the TID associated with the data queued for transmission; and
        when the network interface device determines that the control field is to be generated according to the second format, generate the control field to include a TID subfield set to indicate the TID associated with the data queued for transmission.

12. The apparatus of claim 7, wherein the scaling factor subfield comprises a plurality of bits.

13. A method in a wireless communication network, the method comprising:
    receiving, at a first communication device, a packet from a second communication device, the packet including a control field;
    determining, at the first communication device, whether the control field is in a first format or a second format based on capabilities of the second communication device, wherein the first format is defined by a first communication protocol, and the second format is defined by a legacy second communication protocol;
    when the first communication device determines that the control field is in the first format:
        determining, at the first communication device, that the control field includes i) a scaling factor subfield set to indicate a scaling value (SV), and ii) an unscaled queue size subfield set to indicate an unscaled value (UV), and
        determining, at the first communication device, an estimated amount of data queued for transmission at the second communication device using i) the SV indicated by the scaling factor subfield, and ii) the UV indicated by the unscaled queue size subfield; and
    when the first communication device determines that the control field is in the second format:
        determining, at the first communication device, that the control field i) includes a queue size subfield set to a value indicating the estimated amount of data queued for transmission at the second communication device, and ii) does not include the scaling factor subfield, and
        determining, at the first communication device, the estimated amount of data queued for transmission at the second communication device using the value in the queue size subfield.

14. The method of claim 13, wherein determining whether the control field is in the first format or the second format includes:
    determining, at the first communication device, whether the second communication device is configured to operate according to the first communication protocol;
    in response to determining that the second communication device is configured to operate according to the first communication protocol, determining that the control field is in the first format; and
    in response to determining that the second communication device is not configured to operate according to the first communication protocol, determining that the control field is in the second format.

15. The method of claim 13, wherein determining whether the control field is in the first format or the second format includes:
    determining, at the first communication device, whether the packet conforms to a physical layer (PHY) data unit format defined by the first communication protocol;
    in response to determining that the packet conforms to the PHY data unit format defined by the first communication protocol, determining that the control field is in the first format; and
    in response to determining that the packet does not to conform to the PHY data unit format defined by the first communication protocol, determining that the control field is in the second format.

16. The method of claim 13, wherein determining whether the control field is in the first format or the second format includes:
    determining, at the first communication device, whether the second communication device is configured to recognize the first format;
    in response to determining that the second communication device is configured to recognize the first format, determining that the control field is in the first format; and
    in response to determining that the second communication device is not configured to recognize the first format, determining that the control field is in the second format.

17. The method of claim 13, wherein the scaling factor subfield comprises a plurality of bits.

18. An apparatus in a wireless communication network, the apparatus comprising:
    a network interface device associated with a first communication device, the network interface device having one or more integrated circuit (IC) devices configured to:
        receive a packet from a second communication device, the packet including a control field,
        determine whether the control field is in a first format or a second format based on capabilities of the second communication device, wherein the first format is defined by a first communication protocol, and the second format is defined by a legacy second communication protocol, and when the network interface device determines that the control field is in the first format:

determine that the control field includes i) a scaling factor subfield set to indicate a scaling value (SV), and ii) an unscaled queue size subfield set to indicate an unscaled value (UV), and determine an estimated amount of data queued for transmission at the second communication device using i) the SV indicated by the scaling factor subfield, and ii) the UV indicated by the unscaled queue size subfield; and wherein the one or more IC devices are further configured to, when the first communication device determines that the control field is in the second format:

determine that the control field i) includes a queue size subfield set to a value indicating the estimated amount of data queued for transmission at the second communication device, and ii) does not include the scaling factor subfield, and determine that the estimated amount of data queued for transmission at the second communication device using the value in the queue size subfield.

19. The apparatus of claim 18, wherein the one or more IC devices are further configured to:

determine whether the second communication device is configured to operate according to the first communication protocol;

in response to determining that the second communication device is configured to operate according to the first communication protocol, determine that the control field is in the first format; and in response to determining that the second communication device is not configured to operate according to the first communication protocol, determine that the control field is in the second format.

20. The apparatus of claim 18, wherein the one or more IC devices are further configured to:

determine whether the packet conforms to a physical layer (PHY) data unit format defined by the first communication protocol;

in response to determining that the packet conforms to the PHY data unit format defined by the first communication protocol, determine that the control field is in the first format; and in response to determining that the packet does not to conform to the PHY data unit format defined by the first communication protocol, determine that the control field is in the second format.

21. The apparatus of claim 18, wherein the one or more IC devices are further configured to:

determine whether the second communication device is configured to recognize the first format;

in response to determining that the second communication device is configured to recognize the first format, determine that the control field is in the first format; and in response to determining that the second communication device is not configured to recognize the first format, determine that the control field is in the second format.

22. The apparatus of claim 18, wherein the scaling factor subfield comprises a plurality of bits.

* * * * *